(12) United States Patent
Harding et al.

(10) Patent No.: US 10,589,508 B2
(45) Date of Patent: Mar. 17, 2020

(54) ADDITIVE MANUFACTURING SYSTEMS AND METHODS

(71) Applicant: General Electric Company, Schenectady, NY (US)

(72) Inventors: Kevin George Harding, NIskayuna, NY (US); Victor Petrovich Ostroverkhov, Ballston Lake, NY (US); Jason Harris Karp, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 310 days.

(21) Appl. No.: 15/380,093

(22) Filed: Dec. 15, 2016

(65) Prior Publication Data

US 2018/0169970 A1 Jun. 21, 2018

(51) Int. Cl.
| B29C 64/10 | (2017.01) |
|---|---|
| B33Y 10/00 | (2015.01) |
| B29C 64/153 | (2017.01) |
| B29C 64/386 | (2017.01) |
| B33Y 30/00 | (2015.01) |
| B33Y 50/02 | (2015.01) |

(52) U.S. Cl.
CPC ............ *B33Y 10/00* (2014.12); *B29C 64/153* (2017.08); *B29C 64/386* (2017.08); *B33Y 30/00* (2014.12); *B33Y 50/02* (2014.12); *Y02P 10/295* (2015.11)

(58) Field of Classification Search
CPC ...... B29C 64/153; B29C 64/20; B29C 64/386
See application file for complete search history.

(56) References Cited

U.S. PATENT DOCUMENTS

| 5,040,187 | A | 8/1991 | Karpinski |
| 5,284,790 | A | 2/1994 | Karpinski |
| 6,798,438 | B2 | 9/2004 | Beier et al. |
| 7,800,758 | B1 * | 9/2010 | Bridges ................ G01B 11/002 |
| | | | 356/482 |
| 8,432,943 | B2 | 4/2013 | Ullman et al. |
| 9,048,633 | B2 | 6/2015 | Gronenborn et al. |

(Continued)

FOREIGN PATENT DOCUMENTS

| CN | 1268047 C | 8/2006 |
| WO | 2009/061357 A1 | 5/2009 |

(Continued)

OTHER PUBLICATIONS (VCSEL Arrays Expanding the Range of High-Power Laser Systems and Applications. [online]. Paper presented at ICALEO, 2015 [retrieved on Jan. 18, 2019]. Retrieved from the Internet: <URL: http://www.philips.com/photonics >.) (Year: 2015).*

(Continued)

*Primary Examiner* — Jacob T Minskey
*Assistant Examiner* — Cedrick S Williams
(74) *Attorney, Agent, or Firm* — Armstrong Teasdale LLP

(57) ABSTRACT

A method of forming a build in a powder bed includes emitting a plurality of laser beams from selected vertical-cavity surface emitting lasers (VCSELs) of at least one VCSEL array onto the powder bed, the selected VCSELs of the at least one VCSEL array corresponding to a pattern of a layer of the build; and simultaneously melting powder in the powder bed corresponding to the pattern of the layer of the build.

20 Claims, 5 Drawing Sheets

(56) References Cited

U.S. PATENT DOCUMENTS

Figure 1:
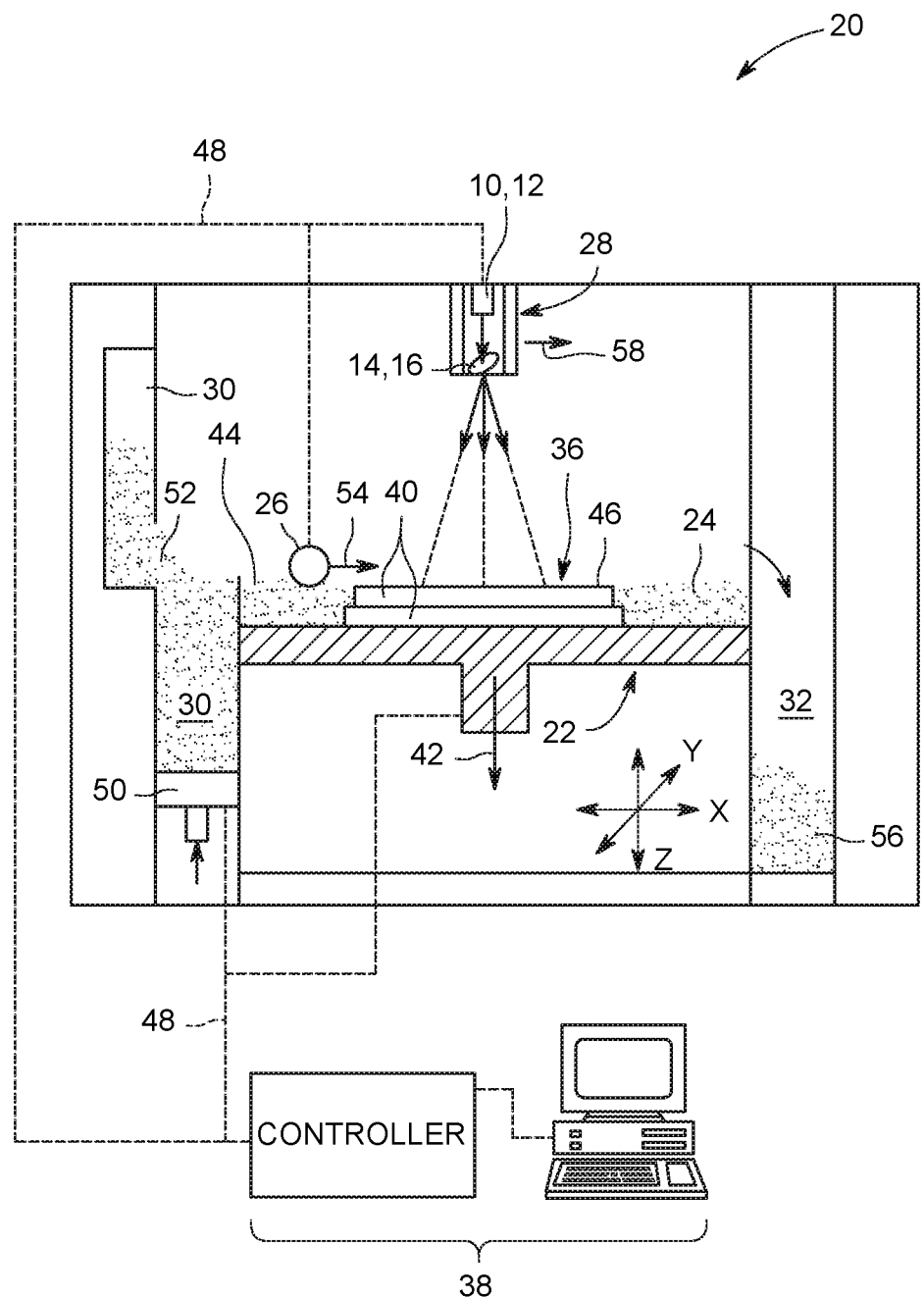

| | | | |
|---|---|---|---|
| 9,075,237 | B2 | 7/2015 | Von Elm et al. |
| 9,279,722 | B2 | 3/2016 | Bolles et al. |
| 9,343,868 | B2 | 5/2016 | Sipes, Jr. et al. |
| 9,373,934 | B2 | 6/2016 | Lin et al. |
| 2007/0211777 | A1 | 9/2007 | Simavoryan |
| 2009/0122272 | A1 | 5/2009 | Silverstein et al. |
| 2009/0206065 | A1 | 8/2009 | Kruth et al. |
| 2012/0285936 | A1* | 11/2012 | Urashima ............ B23K 26/032 219/121.63 |
| 2014/0271328 | A1 | 9/2014 | Burris et al. |
| 2014/0348691 | A1 | 11/2014 | Ljungblad et al. |
| 2015/0165556 | A1* | 6/2015 | Jones ..................... B28B 1/001 264/482 |
| 2015/0273632 | A1 | 10/2015 | Chen |
| 2016/0029517 | A1* | 1/2016 | Kim .................. H05K 7/20409 361/710 |
| 2016/0114427 | A1 | 4/2016 | Eibl et al. |
| 2016/0158889 | A1 | 6/2016 | Carter et al. |
| 2016/0279707 | A1* | 9/2016 | Mattes ..................... B41J 2/451 |
| 2018/0281278 | A1* | 10/2018 | George ............... H01S 5/18355 |

FOREIGN PATENT DOCUMENTS

| | | |
|---|---|---|
| WO | 2015091485 A1 | 6/2015 |
| WO | 2015170330 A1 | 11/2015 |

OTHER PUBLICATIONS

Written Opinion of the International Searching Authority in corresponding international application PCT/US17/58655, dated Feb. 14, 2018.

K.D. Choquette, "8-Vertical cavity surface emitting lasers (VCSELs)", Semiconductor Lasers, pp. 316-340, 2013.

Pruijmboom et al., "Vertical-cavity surface emitting laser-diodes arrays expanding the range of high-power laser systems and applications", Journal of Laser Applications, vol. 28, Issue: 3, 2016.

* cited by examiner

ADDITIVE MANUFACTURING SYSTEMS AND METHODS

BACKGROUND

The present technology relates generally to the use of a laser array, including an array of vertical-cavity surface-emitting lasers (VCSEL), in powder bed fusion additive manufacturing (PBFAM) systems and processes to allow for the creation of full patterns simultaneously to facilitate higher build speeds.

Additive manufacturing is a technology that enables the "3D-printing" of components of various materials including metals, ceramics and plastics. In additive manufacturing, a part is built in a layer-by-layer manner by leveling, for example, metal powder and selectively fusing the powder within a layer using a high-power laser or electron beam. After each layer, more powder is added and the laser patterns the next layer, simultaneously fusing it to the prior layers to fabricate a complete component buried in a powder bed. Additive manufacturing systems and processes are used to fabricate precision three-dimensional components from a digital model.

Current systems and processes are limited in speed by the time needed to fully scan out each part layer in a serial manner using a single scanning mirror to direct a high power laser beam along the outline of one layer of the part to be made. Once the outline of the part is complete, the scanner directs the beam to the region between the inner and outer walls to fill in the material. In each process, the laser melts a thin layer of powdered metal to melt the metal onto the previous layer produced. Once a layer is made, a recoater bar moves across and adds another layer of powder and the process with the laser is repeated. Each layer can take several seconds to a few minute to complete with many thousands of layers needed to make a part.

An alternate way to build a full section at a time is to use a mask which only lets a small area of a wide beam to the powder at one time. A disadvantage of this approach is it is very laser power inefficient, requiring the dumping of most of the laser power.

In making a build in current powder bed systems, the laser beam or electron beam is used to scan a layer of powder to sinter and melt the desired pattern in the layers of the powder bed. The typical scanning time for such systems per layer is in the range of 70-100 seconds. For some applications, the build can require days of processing time. One application of DMLM is in the fabrication and repair of airfoils for gas turbine engines for aircraft. The geometries of the airfoils are difficult to form using conventional casting technologies, thus fabrication of the airfoils using a DMLM process or an electron-beam melting process has been proposed. With the layers built upon one another and joined to one another cross-section by cross-section, an airfoil or portion thereof, such as for a repair, with the required geometries, may be produced. The airfoil may require post-processing to provide desired structural characteristics.

BRIEF DESCRIPTION

In accordance with one example of the technology disclosed herein, a method of forming a build in a powder bed comprises emitting a plurality of laser beams from selected vertical-cavity surface emitting lasers (VCSELs) of at least one VCSEL array onto the powder bed, the selected VCSELs of the at least one VCSEL array corresponding to a pattern of a layer of the build; and simultaneously melting powder in the powder bed corresponding to the pattern of the layer of the build.

In accordance with another example of the technology disclosed herein, a apparatus for forming a build in a powder bed comprises at least one vertical-cavity surface emitting laser (VCSEL) array comprising a plurality of VCSELs; a support configured to support a powder bed or a component configured to support the powder bed at a distance from the at least one VCSEL array; and a controller configured to control the VCSEL array to emit a plurality of laser beams from selected VCSELs of the at least one VCSEL array onto the powder bed, the selected VCSELs of the at least one VCSEL array corresponding to a pattern of a layer of the build and simultaneously melt the powder in the powder bed corresponding to the pattern of the layer of the build.

DRAWINGS

Figure 2:
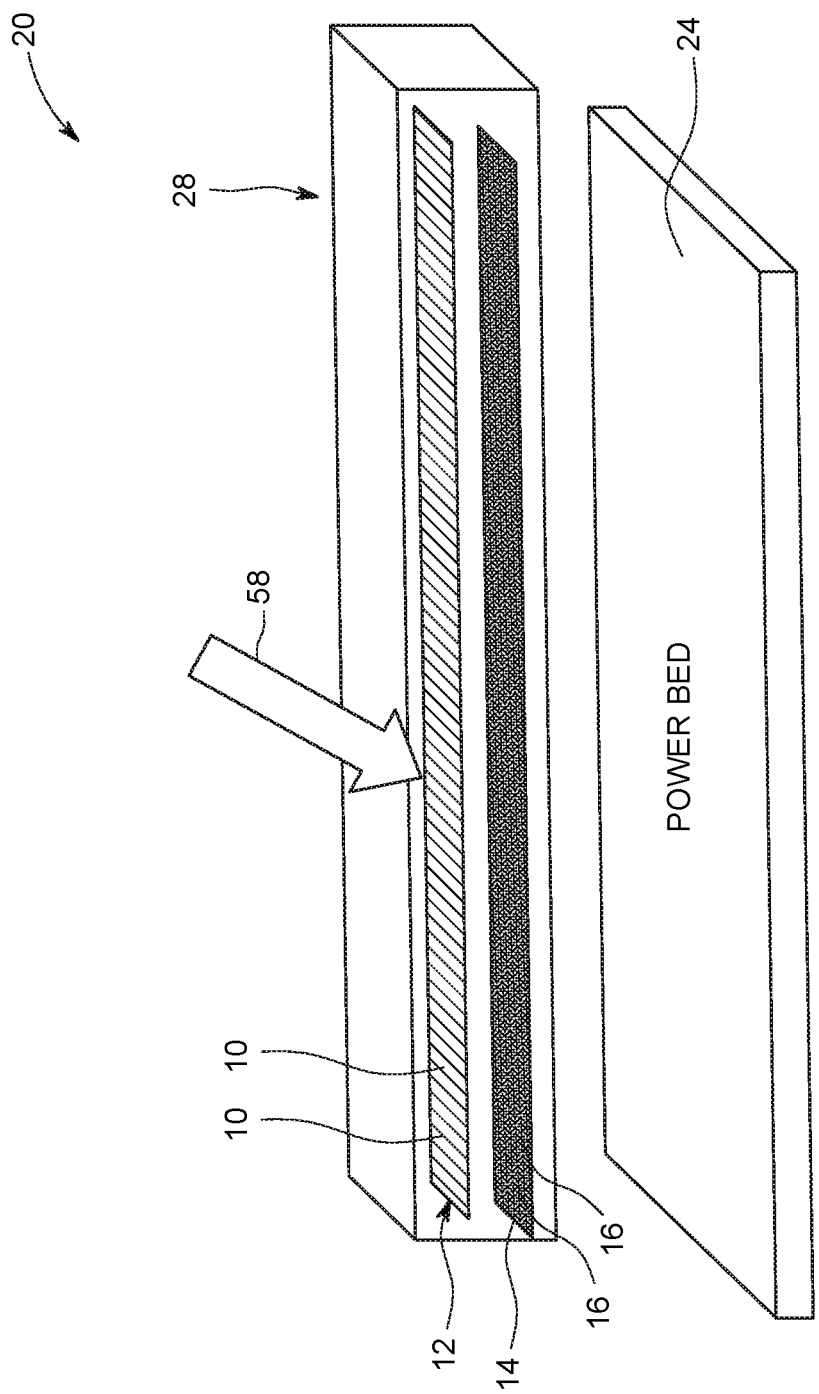
Figure 3:
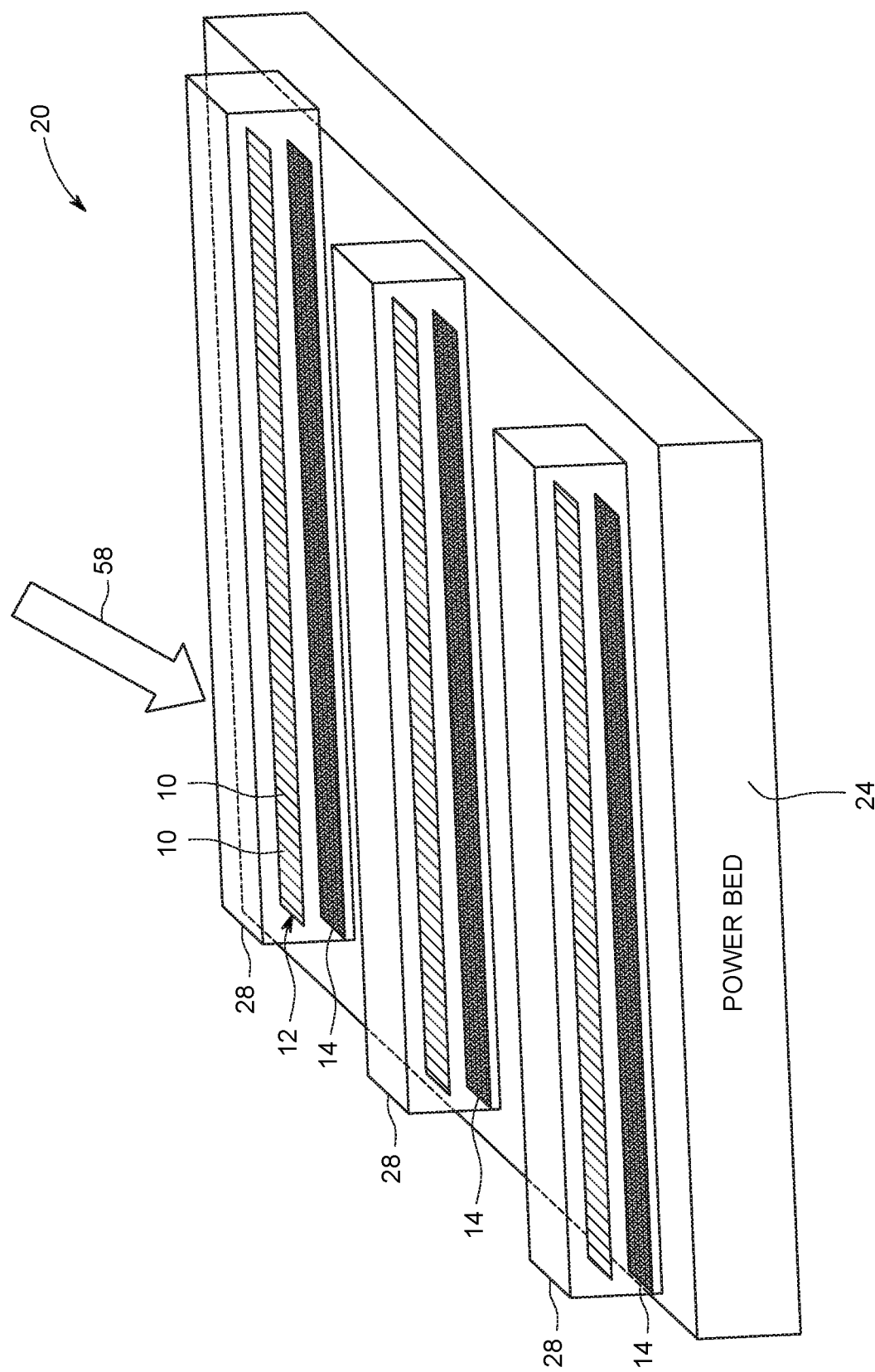
Figure 4:
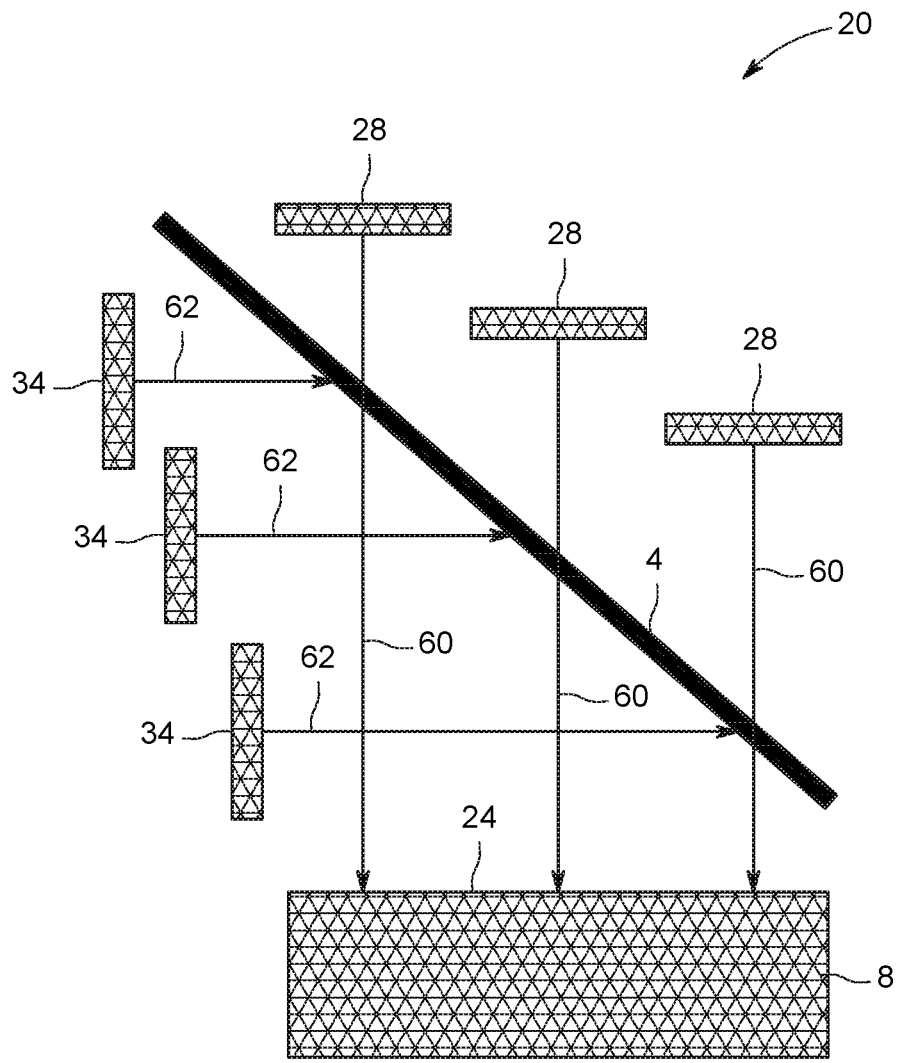
Figure 5:
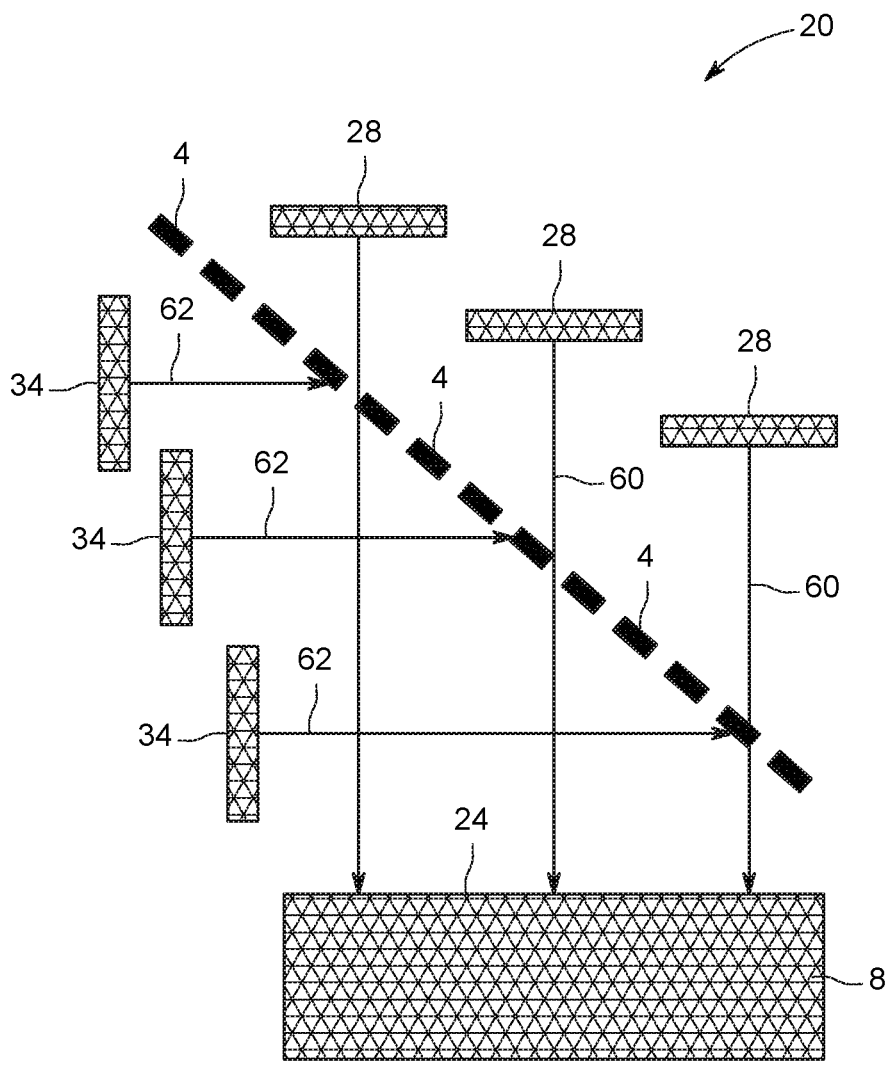

These and other features, aspects, and advantages of the present technology will become better understood when the following detailed description is read with reference to the accompanying drawings in which like characters represent like parts throughout the drawings, wherein:

FIG. 1 schematically depicts a powder bed fusion additive manufacturing system according to an example of the present technology;

FIG. 2 schematically depicts a VCSEL array according to an example of the present technology;

FIG. 3 schematically depicts a plurality of VCSEL arrays according to an example of the present technology;

FIG. 4 schematically depicts a powder bed fusion additive manufacturing system according to another example of the present technology; and FIG. 5 schematically depicts a powder bed fusion additive manufacturing system according to a further example of the present technology.

DETAILED DESCRIPTION

Referring to FIG. 1, a powder bed fusion additive manufacturing (PBFAM) system 20 includes a build table 22 for holding a powder bed 24, a particle spreader or wiper or recoater bar 26 for spreading the powder bed 24 over the build table 22, a powder supply hopper 30 for supplying powder to the spreader 26, and a powder surplus hopper 32. The additive manufacturing system 20 may be configured to build or repair a workpiece 36 in a layer-by-layer fashion.

A controller 38 may have an integral CAD system for modeling the workpiece 36 into a plurality of layers 40 additively built atop one another generally in a vertical or z-coordinate direction (see arrow 42). As manufactured, each solidified layer 40 corresponds to a layer 44 of the powder bed 24 prior to solidification. The powder bed layer 44 is placed on top of a build surface 46 of the previously solidified layer 40. The controller 38 is configured to operate the system 20 through a series of electrical and/or digital signals 48 sent to the system 20 components. For example, the controller 38 may send a signal 48 to a piston 50 of the supply hopper 30 to sequentially push a supply powder 52 upward for receipt by the spreader 26, or alternatively or in addition thereto, the supply hopper 30 may feed powder downward via gravity. The spreader 26 may be a wiper, roller or other device that pushes the powder bed layer 44 in the direction 54 or otherwise places the supply powder 52 over the build surface 46 of the workpiece 36 by a predetermined thickness established through downward movement 42 of the build table 22 controlled by the controller 38. Any excess powder 56 may be pushed into the surplus hopper 32 by the spreader 26. It should be appreciated that the powder bed layer 44 may not be composed of a powder but may take the form of any substrate that may be laid or applied across the build surface 46 in preparation for melting.

The controller 38 may be a computer processor or other logic-based device, software components (e.g., software applications), and/or a combination of hardware components and software components (e.g., a computer processor or other logic-based device and associated software application, a computer processor, or other logic-based device having hard-wired control instructions, or the like).

Referring to FIG. 2, the laser array 28 may comprise an array of VCSELs 10 on one or more silicon chips 12. Each chip 12 may have 10 or more VCSELs 10. To achieve a desired output power from an element, multiple VCSELs may be packaged onto a single addressable unit, or submount. As used therein the term VCSEL thus refers to a single VCSEL or to multiple VCSELs packaged onto a single addressable unit. A cooled lenslet array 14 includes micro-lenses 16 to create a series of laser spots 8 (FIGS. 4 and 5) at high power. The lenslet array 14 may be formed as a one-piece array. By modulating each VCSEL 10 of the array 28 individually as the array 28 is translated across the powder bed 24 in the direction shown by arrow 58, a layer 44 of powder can be selectively melted to form a part 36 one layer 40 at a time. The array 28 thus provides for full writing of a layer 40 by moving the array 28 across the part 36 once. The array 28 may be moved relative to the powder bed 24 by, for example, a liner motor or some other actuator, such as a piston. It should also be appreciated that the relative movement of the array 28 to the powder bed 24 may be accomplished by moving the powder bed 24, or through a combination of moving both the array 28 and the powder bed 24.

Once a substantially level powder layer 44 is established over the build surface 46, the controller 38 may send a signal 48 to a laser array 28 to selectively melt the top layer 44. The controller 38 controls the turning on and turning off of each VCSEL 10. The controller 38 may also control the rate at which the power of each VCSEL 10 is reduced when turned off. The controller 38 may turn each VCSEL 10 on and off within a time frame of, for example, about 5 to 15 milliseconds, or longer if needed. For a given layer of powder 44, for example above an airfoil to be repaired, the desired VCSELs 10 are activated to melt the powder in the desired shape per a CAD design, which may be input and/or stored in the controller 38. This process may be repeated as many times as necessary to build up the required repair region. In the case of the system being used to fabricate a component, e.g. an airfoil, the process is repeated as many times as necessary to build the component. The controller 38 moves the build table 22 downwardly as layers of powder are added and subsequently processed by the VCSEL array 28. Each layer 40 formed may be, for example, about 1 μm to about 1 mm thick. In the case of repair of an airfoil, each layer may be formed, for example, about 100 μm thick.

The VCSEL array 28 may be controlled by the controller 38 to control the heat of powder near or adjacent to the melted region to control the cooling rate of the melted region, i.e. melt pool. The controller 38 may also control the VCSEL array 28 to preheat the powder bed 24 and/or the work piece 36. By pre-heating the powder bed 24 and/or the work piece 36 and/or heating the region near or adjacent to the melt region, the thermal gradient may be controlled to be substantially only in the direction normal to the powder bed 24. This may help with materials that are crack sensitive to fast solidification cooling rates. Desirable grain growth that's normal to the layer surface may be achievable with planar cooling of a powder bed layer. This allows formation of a directionally solidified (DS) type grain structure and a single crystal structure with the build repair of an airfoil type structure. It should also be appreciated that the VCSELs 10 may be controlled to superheat the powder bed 24 to control the viscosity of the melted region. Controlling the viscosity of the melted region allows control over, for example, evaporation of the powder, the grain structure of the solidified layer, and/or the surface finish of the repair or component. The power profile of the array 28 may also be controlled after the powder is melted to control the solidification of the melt pool in the powder bed to form a desired microstructure, for example as disclosed in commonly assigned, co-pending U.S. application Ser. No. 15/014,713.

Referring to FIG. 3, if closer spacing of the powder melting is desired or required than is available with current VCSELs, for example about 0.5 mm, then multiple arrays 28 can be moved relative to the powder bed 24 in tandem. The VCSELs 10 of each array 28 may be staggered from the VCSELs 10 in the other arrays to achieve the desired spacing of the weld beams.

Referring to FIG. 4, a PBFAM system 20 may include a plurality of 2D laser arrays 28, 34, such as VCSEL arrays. It should be appreciated that the arrays may each be a one dimensional (1D) array that is configured to form one line of the pattern at a time and is scanned across the powder bed, in either one or multiple directions, to form the repair or the part. The spacing of the lasers in a VCSEL array may be too large to achieve the power levels needed for melting the powder, for example metal or ceramic powders. To achieve the required spacing, a dichroic beam coupler 4 as shown in FIG. 4, or a plurality of dichroic beam couplers 4 as shown in FIG. 5 may be used a means of combining the laser beams 58, 60 from the arrays 28, 34, respectively, and/or arrays of wider spaced sources into a closely spaced array of addressable laser spots 8. The PBFAM system 20 uses linearly staggered laser arrays 28, 34 with different wavelengths, then combines the beams 60, 62 of the arrays 28, 34 onto the powder bed 24 as laser spots 8. The wavelength of the lasers of the array(s) 28 may differ from the wavelength of the lasers of the array(s) 34 by, for example, 10-200 μm, for example 50-100 μm. As VCSELs may emit polarized beams, it should be appreciated that the polarization of the beams 60, 62 may also be coupled. As with the systems shown in FIGS. 1-3, the arrays 28, 34 may be movable relative to the powder bed 24, for example by moving the arrays 28, 34, moving the powder bed 24, or some combination thereof. It should also be appreciated that other types of lasers, for example laser diodes, may be used in the array instead of VCSELs.

The pattern, or outline, of each layer 40 may be stored in the controller 38 and the VCSEL array(s) may be controlled by the controller to address the laser spots from the lenslet array(s) onto the powder layer 44 provided over the build surface 46 in the shape of the next layer 40 to be fused (i.e. built). The controller 38 may be provided a preselected pattern for each layer 40 and controls the VCSEL array(s) to provide the laser beams from the array(s) to form the pattern in the powder bed by melting the powder according to the pattern.

Each beam 60, 62 of the arrays 28, 34 may operate with different frequencies to meet manufacturing objectives. For example, beams with shorter wavelengths may heat up the powder faster than beams with longer wavelengths. The wavelength for heating and/or melting may be based on the composition of the powder (for example metal or ceramic or polymer). Particles of a powder may have different heat absorption rates impacting melting rates. Besides wavelength, other properties of the beam may be considered. For example, pulsed laser beams or continuous laser beams may be used to melt the powder.

The laser beams of the VCSELs of the array or arrays may have a power of from about 10 to 60 W. For superalloy powders of about 10-60 µm particle size, to melt one spot requires 10 to 25 W of power in a 0.1 mm spot. The material in the powder bed 24 may be metal powder, for example, a nickel or cobalt or iron based superalloy. The particles of the powder bed may be from, for example, 10-100 µm, for example from 40-60 µm. It should be appreciated that other materials, for example plastic, ceramic, or glass, may be used for the powder bed. Depending on the material in the powder bed, the power of the laser beams, including the combined laser beams, may be from about 10 to about 60 W. In instances where the laser beam(s) and the powder bed are moved relative to each other, the velocity of the relative movement also impacts the melting of the powder as it affects the amount of energy deposited in the powder. For example, the power of the beam may be 20 W and the relative velocity of the beam (i.e. the array) and powder bed may be 50 mm/s. At that relative velocity a 100 µm spot of the powder bed will be traversed by the beam in 2 ms and the deposited energy would be 20 W×2 ms=40 mJ/100 µm spot, or about 5 J/mm$^2$. In comparison, a current DMLM single beam system includes an approximately 80 µm beam that travels at 800 mm/s at approximately 300 W, resulting in a deposited energy of 300 W×0.1 ms=30 mJ/80 µm spot, or about 6 J/mm$^2$. The present technology thus allows comparable melting at significantly lower laser power and shorter time periods.

The present technology addresses the problem of the long build time for a part which can reach over 24 hours for even a small part. The integration of the VCSEL array provides accurate alignment of each laser to the others, so avoids a precise assembly step. The use of VCSELs on a chip versus a set of fiber lasers or fiber coupled diodes avoids the use fibers which may get damaged and add extra cost.

By using an integrated set of VCSELSs on a chip, alignment is determined by a precision chip production process and the cost and possible maintenance of fibers is removed compared to fiber lasers. Additionally, the speed of the system is faster than a single scanned laser beam by providing parallel operations simultaneously. The long range cost of the VCSEL chip production may be less expensive than the individual components of diodes and fibers. By producing a closely spaced 2D array of laser sources, the power distribution being used to create the micro melting of powdered metal can be controlled so is to provide the desired melting as well as heat up and cool down times using the 2D array. It also permits the use of separate cooled assemblies of lower power with high efficiency that in a full close array may burn up due to lack of effective cooling.

Although the present technology may be applicable to the build function on components, it should be appreciated that the present technology is applicable for the additive manufacturing repair of components.

It is to be understood that not necessarily all such objects or advantages described above may be achieved in accordance with any particular example. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While certain features of the present technology have been illustrated and described herein, many modifications and changes will occur to those skilled in the art. It is understood that the appended claims are intended to cover all such modifications and changes.

The invention claimed is:

1. A method of forming a build in a powder bed, comprising:
    emitting a plurality of first laser beams having a first wavelength from selected first vertical-cavity surface emitting lasers (VCSELs) of a first VCSEL array onto the powder bed, the selected first VCSELs of the first VCSEL array corresponding to a pattern of a layer of the build;
    emitting a plurality of second laser beams having a second wavelength different than the first wavelength from selected second VCSELs of a second VCSEL array onto the powder bed, the selected second VCSELs of the second VCSEL array corresponding to the pattern of the layer of the build;
    combining the first laser beams and the second laser beams into an array of addressable laser spots via at least one dichroic beam splitter; and
    simultaneously melting powder in the powder bed corresponding to the pattern of the layer of the build.

2. A method according to claim 1, further comprising:
    controlling at least one of a duration of each laser beam, a pulse energy of each VCSEL, a pulse width of each VCSEL, an average output power of VCSEL, an energy distribution of each laser beam, power density of each laser beam, a rate of reduction of the power of each laser beam.

3. A method according to claim 1, further comprising:
    moving the first VCSEL array, the second VCSEL array, and the powder bed relative to each other; and
    simultaneously controlling the VCSELs of the first VCSEL array and the second VCSEL array during relative movement.

4. A method according to claim 1, further comprising:
    emitting laser beams from VCSELs adjacent to the selected VCSELs that correspond to the pattern of the layer; and
    heating powder adjacent to the powder of the layer of the build to control a cooling rate of the melted powder.

5. A method according to claim 1, wherein a difference between the first and second wavelengths is between 50-100 µm.

6. A method according to claim 1, wherein an average power output of each VCSEL is 10-60 W.

7. A method according to claim 1, wherein the VCSELs of each array are staggered from VCSELs in the other arrays.

8. A method according to claim 1, further comprising:
    allowing the melted powder to cool and solidify.

9. An apparatus for forming a build in a powder bed, comprising:
    a first vertical-cavity surface emitting laser (VCSEL) array comprising a plurality of first VCSELs, wherein the plurality of first VCSELs emit first laser beams having a first wavelength;

a second VCSEL array comprising a plurality of second VCSELs, wherein the second VCSELs emit second laser beams having a second wavelength different than the first wavelength;

a support configured to support a powder bed or a component configured to support the powder bed at a distance from the first VCSEL array and the second VCSEL array;

a controller configured to control the first VCSEL array and the second VCSEL array to emit a plurality of first laser beams from selected first VCSELs of the first VCSEL array and a plurality of second laser beams from selected second VCSELs of the second VCSEL array onto the powder bed, the selected first VCSELs of the first VCSEL array and the selected second VCELs of the second VCSEL array corresponding to a pattern of a layer of the build and simultaneously melt the powder in the powder bed corresponding to the pattern of the layer of the build; and at least one dichroic beam splitter configured to combine the first laser beams and the second laser beams into an array of addressable laser spots.

10. An apparatus according to claim 9, wherein the first VCSELs of the first VCSEL array are staggered from the second VCSELs of the second VCSEL array.

11. An apparatus according to claim 9, wherein the controller is configured to move the first VCSEL array and the second VCSEL array and the powder bed relative to each other and simultaneously control the VCSELs of the first VCSEL array and the second VCSEL array during relative movement.

12. An apparatus according to claim 9, wherein an average power output of each VCSEL is 10-60 W.

13. An apparatus according to claim 9, wherein the at least one dichroic beam splitter comprises a plurality of dichroic beam splitters.

14. An apparatus according to claim 9, wherein the controller is further configured to control at least one of a duration of each laser beam, a pulse energy of each VCSEL, a pulse width of each VCSEL, an average output power of VCSEL, an energy distribution of each laser beam, power density of each laser beam, a rate of reduction of the power of each laser beam, and/or a distance of the first and second VCSEL arrays from the powder bed.

15. An apparatus according to claim 14, wherein the controller is further to control the first VCSEL array and the second VCSEL array to emit laser beams from VCSELs adjacent to the selected first and second VCSELs and heat powder adjacent to the powder of the layer of the build to control a cooling rate of the melted powder.

16. An apparatus according to claim 15, wherein the controller is configured to control the first VCSEL array and the second VCSEL array to heat the powder adjacent to the powder of the layer at least one of prior to or during simultaneous melting of the powder of the pattern of the layer or during cooling of the melted powder.

17. An apparatus according to claim 16, wherein the first VCSEL array comprises at least 10 VCSELs on a silicon chip.

18. An apparatus according to claim 9, wherein a difference between the first and second wavelengths is between 50-100 μm.

19. An apparatus according to claim 18, wherein the at least one dichroic beam splitter is configured to interact with the first laser beams in a different manner than the second laser beams based on the difference between the first wavelength and the second wavelength.

20. An apparatus according to claim 19, wherein the first VCSEL array and the second VCSEL array are positioned on opposite sides of the at least one dichroic beam splitter, and wherein the at least one dichroic beam splitter is configured to transmit the first laser beams and reflect the second laser beams.

* * * * *